United States Patent
Kato

(10) Patent No.: US 6,914,682 B2
(45) Date of Patent: Jul. 5, 2005

(54) INTERFEROMETER AND POSITION MEASURING DEVICE

(75) Inventor: Shigeki Kato, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 267 days.

(21) Appl. No.: 10/278,078

(22) Filed: Oct. 23, 2002

(65) Prior Publication Data

US 2003/0081222 A1 May 1, 2003

(30) Foreign Application Priority Data

Oct. 25, 2001 (JP) ........................... 2001-328063
Nov. 8, 2001 (JP) ........................... 2001-342993
Dec. 28, 2001 (JP) ........................... 2001-400298

(51) Int. Cl.[7] .............................................. G02B 9/02
(52) U.S. Cl. ...................................................... 356/493
(58) Field of Search ............................... 356/485, 486, 356/489, 493, 495

(56) References Cited

U.S. PATENT DOCUMENTS

| | | | |
|---|---|---|---|
| 3,881,823 A | * 5/1975 | De Lang et al. | 356/487 |
| 4,633,715 A | 1/1987 | Monchalin | |
| 4,685,803 A | * 8/1987 | Sommargren | 356/484 |
| 4,733,967 A | * 3/1988 | Sommargren | 356/484 |
| 4,886,365 A | * 12/1989 | Ulbers | 356/482 |
| 4,907,886 A | 3/1990 | Dandliker | |
| 5,189,489 A | * 2/1993 | Brunfeld | 356/493 |
| 5,349,440 A | * 9/1994 | DeGroot | 356/489 |
| 5,502,466 A | 3/1996 | Kato et al. | |
| 5,737,070 A | 4/1998 | Kato | |
| 5,737,116 A | 4/1998 | Kadowaki et al. | |
| 5,754,282 A | 5/1998 | Kato et al. | |
| 5,796,470 A | 8/1998 | Ueda et al. | |
| 5,815,267 A | 9/1998 | Kato et al. | |
| 5,926,276 A | 7/1999 | Takamiya et al. | |
| 6,473,184 B1 | 10/2002 | Ishizuka et al. | |

* cited by examiner

*Primary Examiner*—Gregory J. Toatley, Jr.
*Assistant Examiner*—Patrick Connolly
(74) *Attorney, Agent, or Firm*—Fitzpatrick, Cella, Harper & Scinto

(57) ABSTRACT

An interferometer or an interference position measuring device is constituted so that a low coherency light source (multi-mode semiconductor layer) or a plurality of light sources with different wavelengths are used as a light source, a light flux is split into two light fluxes in a light transmitting member, one light flux (reference light flux) is emitted to a reference mirror fixed to an optical head, and the other light flux is emitted to an object to be measured which moves or displaces, the respective reflected light fluxes are multiplexed in the transmitting member so that an interference light flux is obtained, a specified wavelength light is extracted by a wavelength selecting filter through which only a specified wavelength light transmits so as to be detected by a light receiving element.

10 Claims, 5 Drawing Sheets

INTERFEROMETER AND POSITION MEASURING DEVICE

BACKGROUND OF THE INVENTION

1. Field of the Invention

The present invention relates to an interference device and an interference position measuring device for detecting a position fluctuation of an object in a non-contact manner. Particularly, the invention is suitable for a micro interference displacement meter which achieves resolution and accuracy of submicron order by applying a light interfering phenomenon, a machine tool, an assembly adjusting device or the like utilizing the displacement meter.

2. Related Background Art

An interference device which applies a laser is widely utilized as a length measuring device with high accuracy. Generally, such a device requires absolute accuracy and uses a gas laser with a stable wavelength. Further, recently, a device using a semiconductor laser which has been characterized in compactness and simplicity as a simple interference device.

FIG. 1 is a schematic diagram of a conventional interference device using a semiconductor laser as a light source. In FIG. 1, a laser light flux 20 emitted from a semiconductor laser 1a is converted into a parallel light by a collimating lens 2a so as to enter a polarized beam splitter 4 and is divided into a measurement light 20a and a reference light 20b. The measurement light 20a transmits through a ¼λ plate 5b and is converted into a condensed light flux by a condenser lens 6 so as to be condensed on a reflecting surface 7 of an object to be measured 7a. Meanwhile, the light flux reflected by the polarized beam splitter 4 transmits as the reference light 20b through a ¼λ plate 5a and is reflected by a reference mirror (reference surface) 8. The light fluxes which are reflected by the object to be measured 7a and the reference mirror 8, respectively, transmit again through the ¼λ plates 5a and 5b, and the reference light 20b transmits through the polarized beam splitter 4, and the measurement light 20a is reflected to be a multiplexed light flux 21 and enter a ¼λ plate 5c. Since only polarization information of a return light of the measurement light 20a in the multiplexed light flux 21 is modulated, the light flux which has transmitted through the ¼λ plate 5c becomes a linear polarized light which rotates. After that, the light flux enters a nonpolarized light beam splitter 10 so a to be divided into two light fluxes 24a and 24b. Thereafter, the light fluxes transmit through polarizing plates 11a and 11b, optical axes of which are tilted 45° from each other, respectively, so that sine wave signals, phases of which are different by 90° from each other (hereinafter, called the A phase signal and B phase signal) as shown in FIG. 2, are generated on sensors 12a and 12b. Since a polarizing direction of the light flux 20a rotates due to displacement of the object to be measured 7a in a direction of optical axis La, one cycle sine signals can be obtained at sensors 12a and 12b in λ/2 according to the displacement of the object to be measured 7a.

The interference device shown in FIG. 1 is suitable for measuring a rotating axis or the like which is manufactured by mechanical working, for example. When a laser beam is emitted to a scattered portion of the reflecting surface 7 on the object to be measured 7a, a speckle pattern, which is caused by coexisting of a light flux with various phases, is generated in a reflected light. The speckle pattern is a granular pattern of a light, but in the case where the speckle pattern is interfered with a reference light, since interference signals of the speckles have random phases, interference light signals on a sensor are averaged so as to be in a so-called dropout state. The A phase and B phase sine wave signals from the sensors 12a and 12b are calculated into a displacement of the object to be measured 7a according to counted values obtained by counting the A phase signal and the B phase signal by means of a counter and phase information of the A and B phases. Namely, at the time of dropout, since a counter value which is necessary for calculation of displacement information is not updated, when the object to be measured 7a displaces not less than a counter operating distance at the time the signal is recovered, that displacement becomes an error. In the case where the object to be measured is a rotary object, dropout occurs on one portion every time, and since a motion of the axis is mainly axes deviation which synchronizes with the rotation, the axis shows approximately similar action at the time of dropout. Therefore, an error at the time of the dropout is accumulated in every cycle and displacement occurs infinitely. As mentioned above, the measurement of a rotary object has a problem that an error is accumulated infinitely.

SUMMARY OF THE INVENTION

One object of the present invention is to provide an interference device which is capable of preventing occurrence of an error due to dropout and detecting multiplexing information of an object to be measure accurately.

In order to achieve the above object, an interferometer of the present invention has an interference optical system for reflecting a measurement light flux from an object to be measured, reflecting a reference light flux from a reference surface, multiplexing both the reflected light fluxes so as to obtain a multiplexed light flux and obtaining an interference light flux from the multiplexed light flux. The interferometer is characterized in that wavelength selecting means, for extracting only a light flux with a specified wavelength from the multiplexed interference light flux and guiding the extracted light flux into a light receiving element, is provided on an interference light flux optical path.

Further objects and structures relating to the present invention will be clear in description of the embodiments, mentioned later.

DESCRIPTION OF THE PREFERRED EMBODIMENTS

Figure 1:
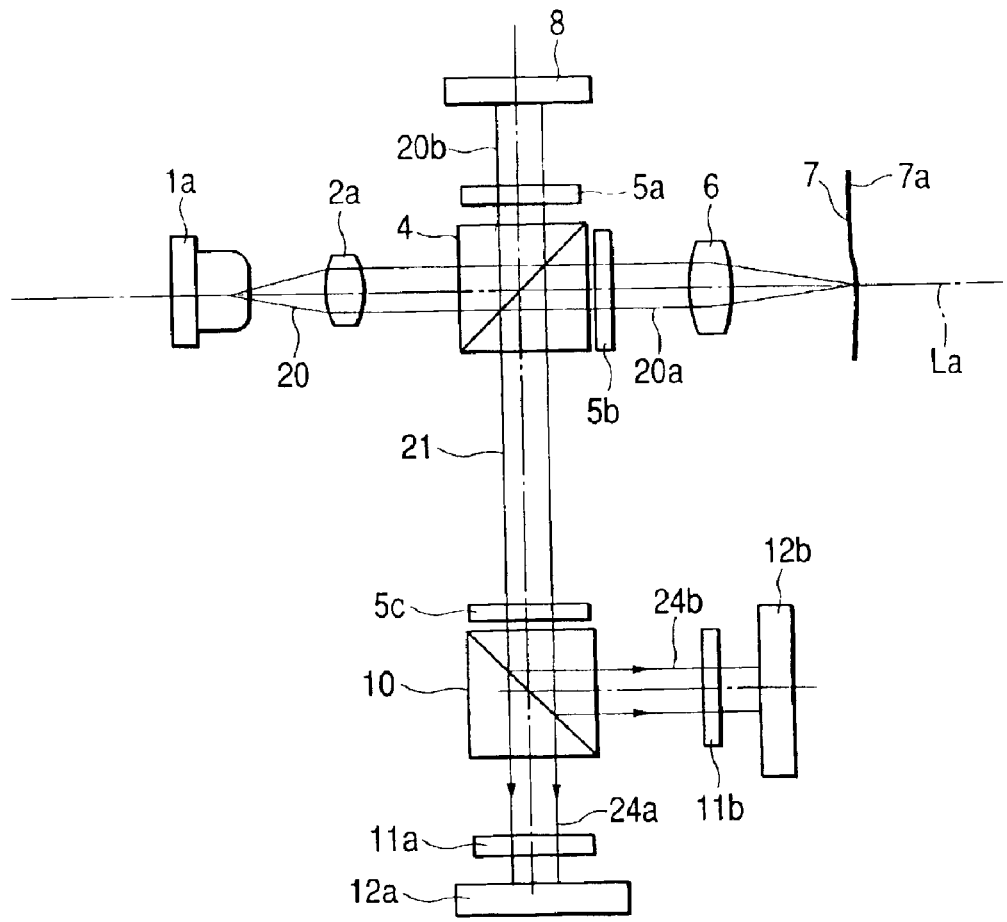
FIG. 1 is a schematic diagram of a conventional interference device.
Figure 2:
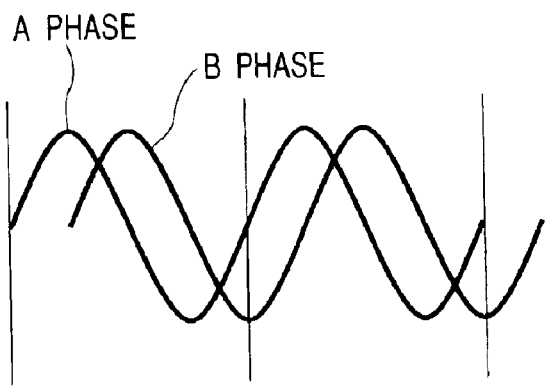
FIG. 2 is an explanatory diagram of an output signal obtained in the conventional interference device.

There will be detailed below the present invention based on embodiments shown in the drawings.

(First Embodiment)

Figure 3:
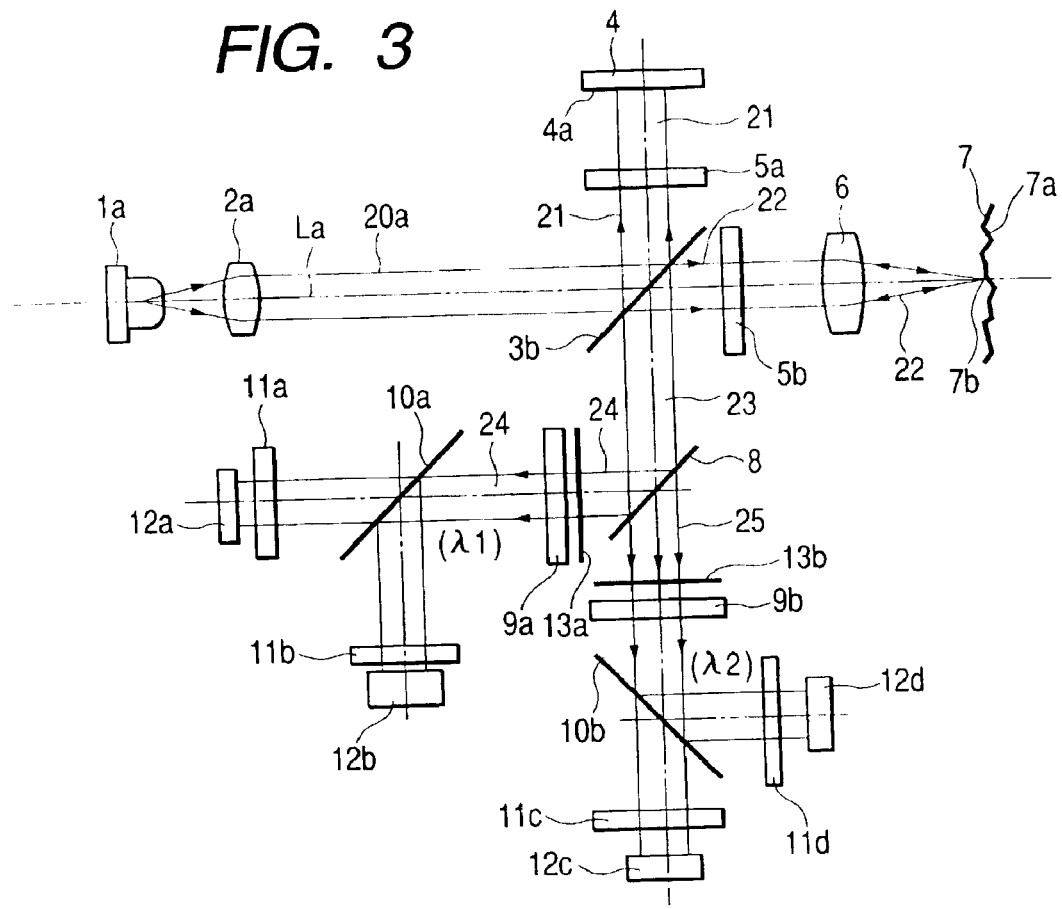
FIG. 3 is a schematic diagram of a main section according to a first embodiment of the present invention.

FIG. 3 is a schematic diagram of a main section of an interference device according to the first embodiment of the present invention. This drawing shows the small interference device using a multi-mode semiconductor laser.

The interference device of the first embodiment uses a multi-mode semiconductor laser as light source means and divides a light flux from the laser into two light fluxes in a light transmitting member. One light flux is reflected by a reflecting surface of a reference mirror fixed to an optical head, and the other light flux is emitted to and is reflected from an object to be measured which moves or displaces. When the light fluxes are multiplexed in the transmitting member and an interference signal is obtained from the multiplexed light flux, the multiplexed flux of the measurement light flux and reference light flux is a light flux from the multi-mode semiconductor laser, and light fluxes from two regions in the multi-mode wavelength width are extracted so that two interference signals are obtained.

In FIG. 3, a laser light flux 20a which is emitted from a multi-mode semiconductor laser (light source) 1a for oscillating a laser beam, the center wavelength of which is a wavelength $\lambda$, is converted into a parallel light flux 20a by a collimating lens 2a. The parallel light flux 20a is separated into P waves and S waves by a polarized beam split surface (light dividing means) 3b. The light flux reflected by the polarized beam splitter 3b becomes a reference light flux 21, and transmits through a ¼$\lambda$ wavelength plate 5a to be reflected by a reflecting mirror 4. On the other hand, the light flux which has transmitted through the polarized beam split surface 3b transmits as a measurement light flux 22 through a ¼$\lambda$ wavelength plate 5b and becomes a condensed light flux by means of a condenser lens 6 so as to be emitted to the object to be measured 7a. At this time, the measurement light 22 is condensed on a reflecting surface 7 of the object to be measured 7a. After the light flux 22 is reflected by the reflecting surface 7, it again passes through an optical path and is reflected by a beam split surface (light synthesizing means) 3b. On the other hand, after the reference light flux 21 is reflected, it passes through an original optical path and transmits through the beam split surface 3b so as to be multiplexed with the measurement light 22 and become a light flux (synthesized light flux) 23. Thereafter, the light flux 23 enters a nonpolarized beam splitter 8 and its reflected light becomes a light flux 24 and its transmitted light becomes a light flux 25.

At this time, when a power of the condenser lens 6 is set so that a condensing point 7b of the light flux 22 on the reflecting surface 7 has the same wave optical light path length as that of the reflecting surface 4a from which the reference light flux 21 is reflected, the interference device displays the maximum effect as an interferometer using the semiconductor laser 1a. Namely, when a wave front is considered, a reflected light from the reflecting surface 7 of the object to be measured 7a and a return light from the reflected light 21 from the reflecting surface 4a as a reference light are multiplexed as a parallel light.

Figure 4:
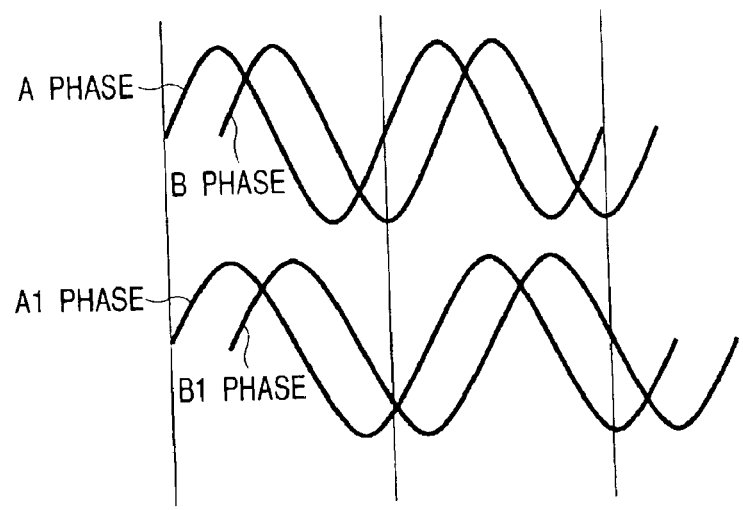
FIG. 4 is a schematic diagram of an output signal obtained in the first embodiment of the present invention.

The light flux 24 transmits through a band pass filter (extracting means) 13a for transmitting light having wavelength $\lambda_1$, and a transmitted light has only light having wavelength $\lambda_1$ information. Here, instead of the band pass filter, an interference filter may be used. A light flux with wavelength $\lambda_1$ transmits through a ¼$\lambda$ plate 9a so as to become a linear polarized light, and a polarizing direction of polarization information rotates based on a displacement of the object to be measured 7a. The light flux 24 of the rotating linear polarized light is divided by a nonpolarized beam splitter 10a, and its transmitted light transmits through a polarizing plate 11a and its reflected light transmits through a polarizing plate 11b, so that they become brightness/darkness signals of the lights and the signals become electric signals by photoelectric sensors 12a and 12b, respectively. The electric signals obtained by the photoelectric sensors 12a and 12b become sine wave electric signals for 1 cycle with respect to ½$\lambda_1$, movement according to the movement of the object to be detected 7a. The polarizing plates 11a and 11b are provided so that their polarization axes tilt 45°, and the sine signals from the photoelectric sensors 12a and 12b become signals, phases of which are different by 90° from each other as shown in FIG. 4 (hereinafter, A phase and B phase). In the present embodiment, a displacement (including variable magnification direction) of the reflecting surface 7 in a direction of optical axis La is obtained from the A phase and B phase signals obtained at that time.

Meanwhile, the light flux 25 which transmits through the nonpolarized beam splitter 8 transmits through a band pass filter (extracting means) 13b for transmitting light having wavelength $\lambda_2$ and the transmitted light has only information of light having wavelength $\lambda_2$. Thereafter, the light transmits through the ¼$\lambda$ plate 9b and is divided into two by the nonpolarized beam splitter 10b. A light flux in one direction transmits through a polarizing plate 11c and the other light flux transmits through a polarizing plate 11d and they enter the photoelectric sensors 12c and 12d, respectively. Next, the electric signals become sine wave electric signals of 1 cycle with respect to ½$\lambda_2$ movement according to the movement of the object to be detected 7a in the direction of optical axis La. Since the polarizing plates 11c and 11d are provided so that their polarization axes are tilted 45°, as shown in FIG. 4 the electric signals become sine signals, A1 phase and B1 phase of which are different by 90° from each other. Here, the polarized beam splitters 10a and 10b, the polarizing plates 11a, 11b, 11c and 11d and the like compose one element of interference means.

Figure 5:
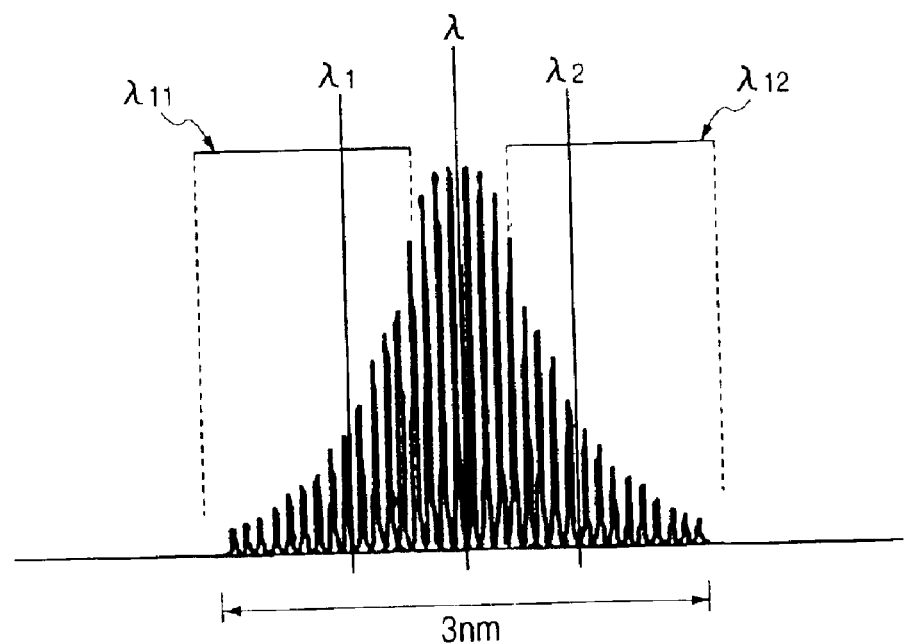
FIG. 5 is an explanatory diagram of a wavelength spectrum of a multi-mode semiconductor laser to be used in the first embodiment of the present invention.

Next, there will be explained below wavelengths $\lambda_1$ and $\lambda_2$ to be extracted, as shown in FIG. 5.

Figure 6:
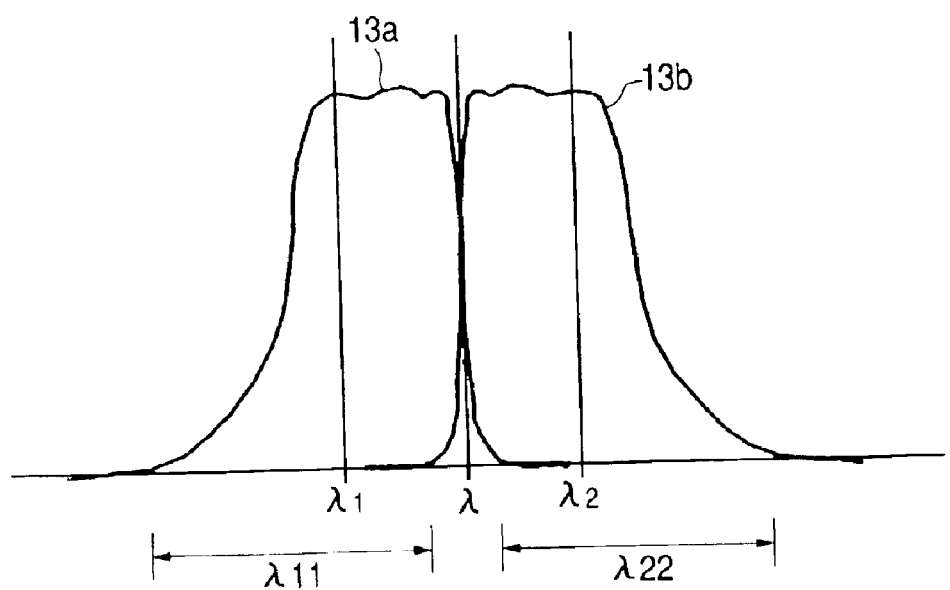
FIG. 6 is an explanatory diagram of transmitting property of a band pass filter to be used in the first embodiment of the present invention.

Since the light source 1a is a multi-mode semiconductor laser, the wavelength spectrum has a width of about 3 nm as aggregate thin spectrum lines including a wavelength $\lambda$ as a center thereof, as shown in FIG. 5. As for light which is divided by the nonpolarized beam splitter 8, the band pass filters 13a and 13b extract lights having wavelengths $\lambda_1$ and $\lambda_2$, respectively, but the band pass filters 13a and 13b are constituted so as to have characteristics for transmitting extracting regions $\lambda 11$ and $\lambda 22$ as shown in FIG. 6. The transmitted laser beams generate interference signals.

The interferometer of the present embodiment is set so that phases of sine signals from two set wavelengths are not the same as each other in a coherent distance range of the multi-mode semiconductor laser. Namely, when the coherent distance of the multi-mode semiconductor laser is designated by L, if $\lambda_1 \times \{\lambda_1 \div (\lambda_2 - \lambda_1)\}/2 \geq L$, an absolute value can be measured because sine wave phases obtained from two lights having wavelengths $\lambda_1$ and $\lambda_2$ in the measuring range of a laser interference displacement meter do not become the same. Specifically, if coherent distance of the multi-mode laser 1a is 200 $\mu$m, when center wavelengths of the multi-mode laser 1a, $\lambda$=650 nm, $\lambda_1$=649 nm and $\lambda_2$=651 nm, the phases do not become the same in the range of the coherent distance 200 $\mu$m.

In addition, when a temperature of the light source 1a is adjusted by temperature adjusting means such as a Peltier element, interference signals obtained from the light having wavelengths $\lambda_1$, and $\lambda_2$ can be always maintained in the same level. Further, signal levels of the photoelectric sensors 11a, 11b, 11c and 11d are monitored, and the Peltier element is fed back so that a transmitting light amount of the band pass filters 13a and 13b becomes the same as each other. As a result, the interference signals from the lights having wavelengths $\lambda_1$ and $\lambda_2$ can have the same level.

A number of wavelength regions to be extracted by extracting means from a wavelength range of a light flux oscillated from the multi-mode semiconductor laser 1a may be two or more, and an interference signal may be obtained by using multiplexed light fluxes from respective regions.

(Second Embodiment)

Figure 7:
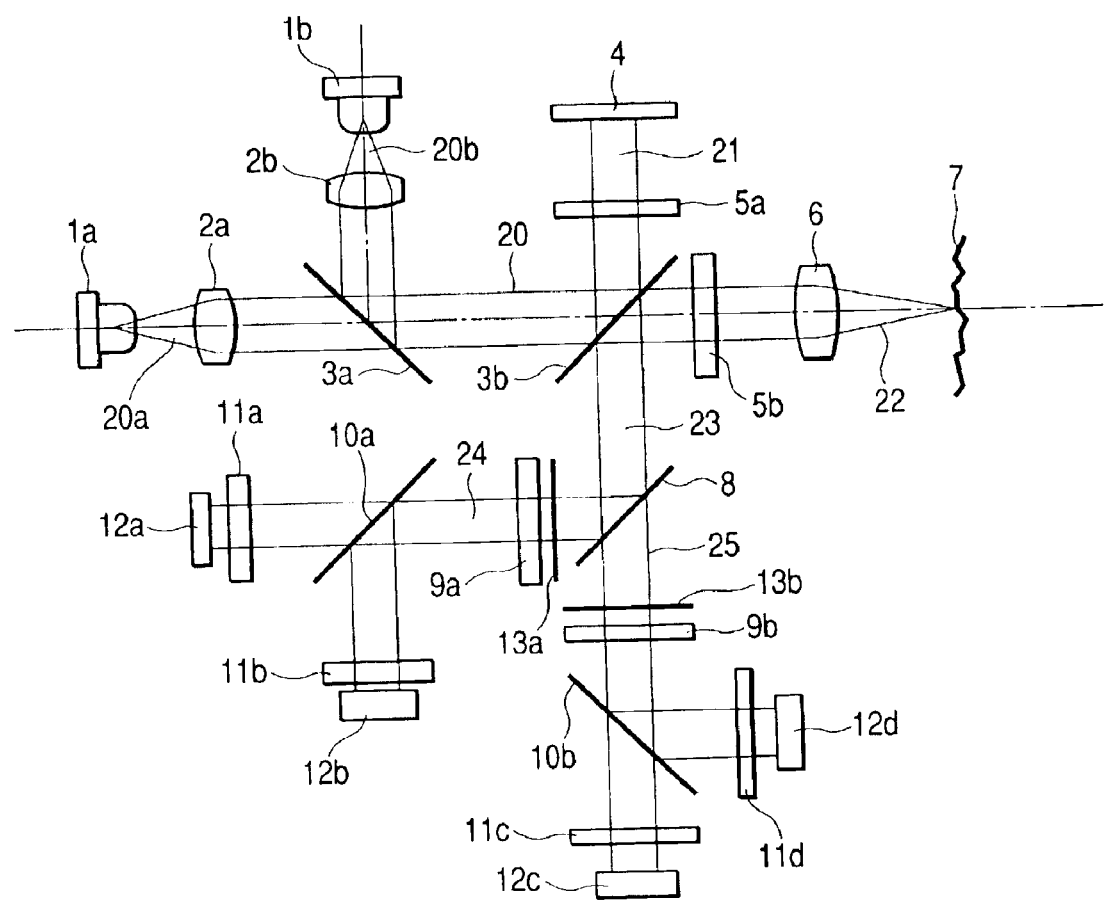
FIG. 7 is a schematic diagram of a main section according to a second embodiment of the present invention.

FIG. 7 is a diagram showing a schematic configuration of an interferometer (position measuring device) using a semiconductor laser according to a second embodiment of the invention. Here, in FIG. 7, parts similar to those in FIGS. 1 and 3 are designated by like reference numerals.

After the laser light flux 20a emitted from the semiconductor laser 1a for generating a laser beam with wavelength $\lambda_1$ is converted into a parallel light flux by the collimating lens 2a, the light flux transmits through the polarized beam split surface 3a. Meanwhile, a semiconductor laser 1b for generating a laser beam with wavelength $\lambda_2$ is provided so that its polarizing direction is vertical to the semiconductor laser 1a. After the laser light flux 20b emitted from the semiconductor laser 1b is converted into a parallel light flux by a collimating lens 2b, the light flux is reflected by the polarized beam split surface 3a. The light flux which has transmitted through the polarized beam split surface 3a and the light flux which has been reflected by the polarized beam split surface 3a are multiplexed so as to become a light flux 20 where light fluxes having $\lambda_1$ and $\lambda_2$ coexist. Thereafter, the light flux is separated into P waves and S waves by the polarized beam split surface 3b. Since the following operation is the same as that in the first embodiment, explanation thereof is omitted.

In the case where an axis with a diameter of 4 mm which rotates with axis deviation of 20 μm, for example, is measured for a cut or a surface defect with a width of 0.5 mm, when a signal dropout occurs due to a cut with a width of 0.5 mm, a signal is dropped out at about 1/25 portion of an outer periphery. This means that a reflecting surface (front surface) of the axis possibly displaces by about ±2 μm during the dropout. Namely, in this case, two wavelengths $\lambda_1$ and $\lambda_2$ are set so that phases of two sine signals obtained from the two lights having wavelengths $\lambda_1$ and $\lambda_2$ do not coincide with each other in a measuring range of 4 μm. As a result, even if a dropout occurs, measurement in a position of the reflecting surface of the axis can be restarted with correct value at the time of recovery from the dropout.

More specifically, when $\lambda_1$ and $\lambda_2$ are set so as to satisfy the equation (1) so that the phases of two sine signals obtained from lights having wavelengths $\lambda_1$ and $\lambda_2$ do not coincide with each other in the measuring range of width 4 μm, a surface position of a rotating axis or an axis deviation can be measured accurately.

$$\lambda_1 \times \{\lambda_1 \div (\lambda_2 - \lambda_1)\}/2 \geq 4 \, \mu m \quad (1)$$

For example, when wavelengths $\lambda_1$ and $\lambda_2$ of laser beams generated from the two semiconductor lasers 1a and 1b are 650 nm and 680 nm, respectively, sine signals where one cycle is 650/2=325 nm are output from the sensors 12a and 12b, respectively, and sine signals where one cycle is 680/2=340 nm are output from the sensors 12c and 12d, respectively. "A phases" and "B phase" in FIG. 4 is one example of the output signal waveforms of the sensors 12a and 12b, and "A1 phase" and "B1 phase" in FIG. 4 are one example of the output waveforms of the sensors 12c and 12d. Since the phases of the output sine signals from the sensors 12a and 12b and the output sine signals from the sensors 12c and 12d coincide with each other about ±6 μm before, even if an axis with a diameter of 4 mm satisfies the equation (1) sufficiently and rotates with an axis deviation of 20 μm and has a cut with width of 0.5 mm, its surface position can be measured.

The above-mentioned axis measuring example is an extreme example, and in normal measurement of an axis deviation, an axis diameter is larger than 4 mm and a cut existing on the axis is narrower than 0.5 mm. Therefore, the above-mentioned setting example of wavelength can cope with measurement of a rotating axis in approximately all aspects.

As mentioned above, when two wavelengths $\lambda_1$ and $\lambda_2$ are set so that the phases of two sine signals (periodic signals) obtained at the two light having wavelengths $\lambda_1$ and $\lambda_2$ in a predetermined measuring range do not coincide with each other, dropout does not occur on the same places of both the two sine signals. For this reason, a surface position of an axis can be measured accurately.

(Third Embodiment)

Figure 8:
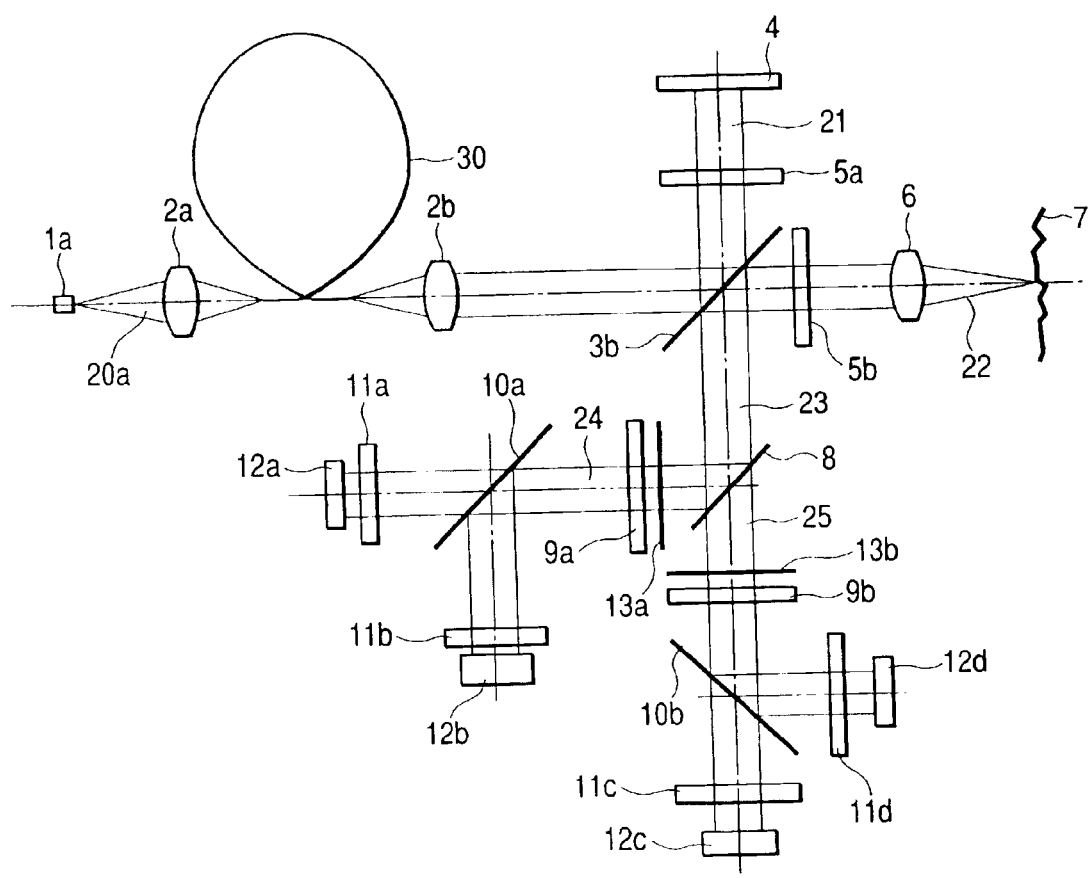
FIG. 8 is a schematic diagram of a main section according to a third embodiment of the present invention.

FIG. 8 is a schematic configuration of a small interferometer using a semiconductor laser according to the present embodiment of the invention. In the drawing, parts similar to those in FIGS. 1 and 3 are designated by similar reference numerals.

The laser light flux 20a emitted from the multi-mode semiconductor laser 1a with center wavelength λ becomes a condensed light flux by means of the lens 2a and is guided to and passes through a multi-mode fiber 30 so as to enter the lens 2b. By using the multi-mode fiber 30, spectrum distribution of the multi-mode laser shown in FIG. 5 can be converted into smooth spectrum with Gaussian distribution. As a result, a light flux having characteristics similar to that of a single mode laser can be obtained.

Since the other operations are the same as those in the first embodiment, explanation thereof is omitted.

In addition, even if an SLED (Super Luminescence Diode) is used as a light source, the same effect can be obtained.

In addition, even if an interference film filter is a filter utilizing fiber grating, the same effect can be obtained. As for demultiplexing, in the present embodiment, wavelengths are extracted by nonpolarized beam splitter and band pass filter, but even when well known AWG (Arrayed Wave Guide) is utilized, lights with wavelengths $\lambda_1$ and $\lambda_2$ can be extracted similarly.

What is claimed is:

1. An interferometer comprising:
 a first light flux split optical system for splitting a laser light flux having a plurality of wavelengths into a measurement light flux illuminating an object to be measured and a reference light flux illuminating a reference surface;
 a multiplexing optical system for multiplexing the measurement light flux reflected by the object to be measured and the reference light flux reflected by the reference surface so as to obtain an interference signal;
 a second light flux split optical system for splitting a light flux multiplexed by the multiplexing optical system into plural light fluxes;
 a wavelength selecting optical system for extracting light fluxes, each of which has a wavelength different from each other light flux, from the plural light fluxes obtained by the second light flux split optical system; and photoelectric sensors, each of which (i) receives a respective light flux from the light fluxes selected by the wavelength selecting optical system, and (ii) outputs a signal which relates to the received, respective light flux.

2. The interferometer according to claim 1, wherein the laser light flux having plural wavelengths is generated from a multi-mode semiconductor laser light source, a super luminescent diode or a plurality of laser diodes of different wavelengths.

3. The interferometer according to claim 1, wherein the wavelength selecting optical system is an interference film filter or Bragg cell fiber grating.

4. The interferometer according to claim 1, wherein the first light flux split optical system is a polarized beam splitter.

5. The interferometer according to claim 1, wherein the signals obtained from the photoelectric sensor change periodically, and the different wavelengths are set so that a position where all the phases of the periodic signals coincide is not generated within a predetermined measuring range.

6. The interferometer according to claim 5, wherein, when a plurality of wavelengths of the light flux are designated by $\lambda_1$ and $\lambda_2$, the wavelengths $\lambda_1$ and $\lambda_2$ satisfy an equation:

$$l_1 \times \{l_1 \div (l_2-l_1)\}/2 \geq 4 \text{ mm}.$$

7. The interferometer according to claim 1, wherein the plural signals from the photoelectric sensor change periodically, and the different wavelengths are set so that a position where all the phases of the periodic signals coincide is not generated within a coherent distance of the multi-mode laser.

8. The interferometer according to claim 1, wherein when the plural wavelengths of the light flux are designated by $\lambda_1$ and $\lambda_2$ and a coherent distance of the multi-mode laser is designated by L, $\lambda_1$, $\lambda_2$ and L satisfy an equation:

$$l_1 \times \{l_1 \div (l_2-l_1)\}/2 \geq L.$$

9. An interference position measuring device comprising:

a first light flux split optical system for splitting a laser light flux having a plurality of wavelengths into a measurement light flux illuminating an object to be measured and a reference light flux illuminating a reference surface;

a multiplexing optical system for multiplexing the measurement light flux reflected by the object to be measured and the reference light flux reflected by the reference surface so as to obtain an interference signal;

a second light flux split optical system for splitting a light flux multiplexed by the multiplexing optical system into plural light fluxes;

a wavelength selecting optical system for extracting light fluxes, each of which has a wavelength different from each other light flux, from the plural light fluxes obtained by the second light flux split optical system; and photoelectric sensors, each of which (i) receives a respective light flux from the light fluxes selected by the wavelength selecting optical system, and (ii) outputs a signal which relates to the received, respective light flux.

10. A machine tool or assembly device comprising an interference position measuring device which comprises:

a first light flux split optical system for splitting a laser light flux having a plurality of wavelengths into a measurement light flux illuminating an object to be measured and a reference light flux illuminating a reference surface;

a multiplexing optical system for multiplexing the measurement light flux reflected by the object to be measured and the reference light flux reflected by the reference surface so as to obtain an interference signal;

a second light flux split optical system for splitting a light flux multiplexed by the multiplexing optical system into plural light fluxes;

a wavelength selecting optical system for extracting light fluxes, each of which has a wavelength different from each other light flux, from the plural light fluxes obtained by the second light flux split optical system; and photoelectric sensors, each of which (i) receives a respective light flux from the light fluxes selected by the wavelength selecting optical system, and (ii) outputs a signal which relates to the received, respective light flux.

* * * * *

UNITED STATES PATENT AND TRADEMARK OFFICE
CERTIFICATE OF CORRECTION

PATENT NO. : 6,914,682 B2 Page 1 of 1
DATED : July 5, 2005
INVENTOR(S) : Shigeki Kato It is certified that error appears in the above-identified patent and that said Letters Patent is hereby corrected as shown below:

Column 1,
Line 46, "so a to be" should read -- so as to be --.

Column 2,
Line 27, "measure" should read -- measured --.

Column 5,
Line 65, "phases" should read -- phase --.

Column 6,
Line 18, "light" should read -- lights --.

Column 7,
Line 24, "λ1and" should read -- $\lambda_1$ and --;
Lines 25 and 38, "$l_1$" should read -- $\lambda_1$ -- (all three instances) and "$l_2$" should read -- $\lambda_2$ --.

Signed and Sealed this

Second Day of May, 2006

JON W. DUDAS
*Director of the United States Patent and Trademark Office*